April 21, 1936.　　　　W. E. MORRIS　　　　2,038,189
RIVET AND METHOD OF SETTING SAME
Filed Aug. 3, 1932
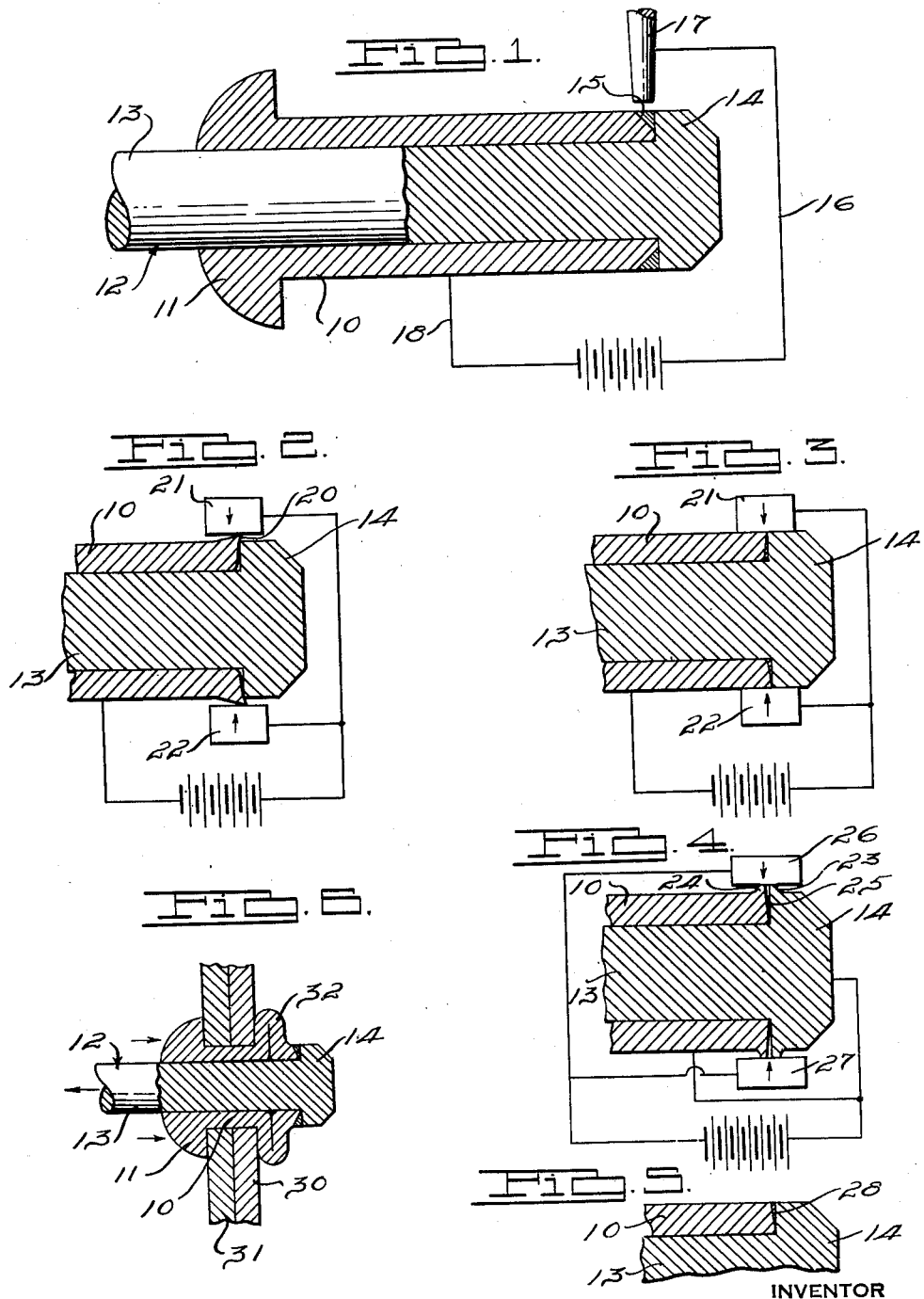
INVENTOR
Will E. Morris.
BY
Harness, Dickey, Pierce & Harms
ATTORNEYS.

Patented Apr. 21, 1936

2,038,189

UNITED STATES PATENT OFFICE 2,038,189

RIVET AND METHOD OF SETTING SAME

Will E. Morris, Detroit, Mich., assignor, by mesne assignments, to Huxon Holding Corporation, Detroit, Mich., a corporation of Michigan Application August 3, 1932, Serial No. 627,344

12 Claims. (Cl. 218—29)

The invention relates to fastening devices and it has particular relation to a rivet for connecting structural elements.

The type of rivet to which the invention is generally related has been illustrated and described in co-pending applications for patent relating to rivets of Louis C. Huck, Serial No. 545,004, filed June 17, 1931, and Serial No. 604,759, filed April 12, 1932. A rivet of this type may comprise a tubular metal member adapted to project through openings in the structure to be riveted, and having a preformed head at one end for engaging one side of the structure. The opposite end portion of the tubular member initially is adapted to project beyond the opposite side of the structure and to be bulbed into a head at such side of the structure. The rivet also includes a pin shank member of harder metal extending through the tubular member and this pin projects outwardly from the preformed head on the tubular member and at its other end is provided with a head for engaging the end face of the latter. When a rivet of this character is set, the projecting end of the pin is pulled while the reactionary force is applied against the preformed head on the tubular member, or in the event no preformed head is provided, against the end of the tubular member, and during this operation the body portion of the tubular member between the structure and the head on the pin is subjected to axially compressive forces and is outwardly bulbed during movement of the pin into a head.

The present invention is particularly related to the locking of the tubular member and the pin or shank member, adjacent the head on the latter for the purpose of preventing movement of the head on the pin through the tubular member or in other words to prevent enlargement or bursting of the end portion of the tubular member adjacent the head on the pin, during the rivet setting operation, to the end that the body portion of the tubular member will be outwardly bulbed in a proper manner.

The object of the invention is to provide a rivet of the general character above set forth wherein the tubular member and the pin are locked adjacent the head on the male member in a permanent, integral manner.

For a better understanding of the invention reference may be had to the accompanying drawing forming a part of the specification, wherein:

Figure 1 is a longitudinal cross-sectional view of a rivet of the type previously described, illustrating one manner in which a tubular member and the pin may be welded together;

Fig. 2 is a fragmentary, longitudinal cross-sectional view illustrating another way in which the welded connection may be effected;

Fig. 3 is a view similar to that shown by Fig. 2 and illustrating the assembly following the welding operation;

Fig. 4 is a view similar to that shown by Fig. 2 illustrating still another way in which the tubular member and the pin may be welded together;

Fig. 5 is a fragmentary view of the construction shown by Fig. 4, after the welding operation has been completed;

Fig. 6 is a cross-sectional view illustrating the manner in which a rivet such as illustrated in the several views may be set for the purpose of riveting structural elements.

Referring to Fig. 1, a tubular rivet member is indicated at 10 and such member is illustrated as having a head 11 at one end which simulates the ordinary rivet head in appearance. A pin or shank member 12 extends through the tubular member and projects beyond the head 11 to provide a gripping portion 13, whereas the opposite end of the pin terminates in an enlarged head 14, the outer diameter of which may substantially correspond with the outer diameter of the body portion of the tubular member to permit insertion of the rivet through openings in a structure to be riveted. Adjacent the inner face of the head 14, the end face of the tubular member may initially be beveled as indicated at 15 to provide an outwardly exposed recess between the head and the end of the tubular member. The pin and the tubular member then may be welded in the region of the head 14 and, as illustrated in Fig. 1, an arc welding process may be employed which includes the electrical circuit 16 having the metal welding electrode 17 and a terminal 18 connected at any convenient point along the body of the female member. It will be understood that when the electrode 17 is brought into juxtaposition with respect to the outwardly exposed recess defined by the bevel 15, arcing of the current will occur which results in a welding temperature at each end of the arc. The metal in electrode 17 as well as the metal in the head 14 and the tubular member 10 in the region of the recess mentioned will be raised to welding temperature and metal from the electrode will be deposited in the recess and welded to both the pin and tubular members. Both members are rigidly and in effect integrally connected in the region of the head 14 in this manner partially or entirely around their circumference.

According to the constructions shown by Figs. 2 and 3, the tubular member 10 may initially be provided with an undercut or counter-sunk face 20 and then when the parts are assembled under pressure by telescoping one member into the other, the beveled face causes an upsetting or movement of a portion of the tubular member in a radial direction outwardly over the head 14 on the male member, and provides a recess between the head 14 and the end face of the tubular member particularly at the inner, radial extent of such end face. Then by bringing suitable electrical terminals 21 and 22 into contact with the projection on the female body, the metal therein and the metal in the head 14 adjacent thereto, may be raised to a welding temperature. In this construction it may be found desirable to use pressure on the terminals 21 and 22 to effect a final diameter corresponding to the outer diameter of the female member and thereby cause a flow of the metal into the recess as shown, for example, in Fig. 3. Rollers might be used as electrical terminals and moved circumferentially around the rivet to insure welding at all points.

In the constructions shown by Figs. 4 and 5, the head 14 and the tubular member 10 at adjacent points are provided with outwardly directed ribs 23 and 24 and preferably one of the members as for example the female member 10 may have a slight bevel 25 to provide a recess between the head 14 and such tubular member. Electrical terminals indicated at 26 and 27 then may be brought into engagement with both ribs thereby raising their temperature to a degree required for welding and as a result of this operation, the parts may be welded and metal forced into the recess 25, as indicated at 28 in Fig. 5.

In any of the constructions illustrated and described, it is apparent that the tubular member and pin are welded adjacent the head 14 on the pin and, accordingly, the end of the tubular member adjacent the head 14 will positively be maintained in position. During setting of a rivet of any of the types illustrated, the assembly is inserted through openings in structural elements such as indicated at 30 and 31 in Fig. 6 until the head 11 abuts the structure. Then by means of suitable mechanism such as illustrated, for example, in the co-pending application of Louis C. Huck and George T. Chapman, Serial No. 615,544, filed June 6, 1932, the pin may be pulled while the reactionary force is applied against the head 11, the direction of force application being indicated by the arrows shown in this figure. During this operation, the head 14 on the pin in conjunction with the head 11 on the tubular member and the structural elements 30 and 31, causes axial compression of the body portion of the tubular member between the head 14 and the structural element 30 and this axial compression causes an outward bulbing of the body portion of the tubular member to provide a head indicated at 32. It will be apparent that the welded connection between the head 14 and the end of the tubular member prevents bursting of this end of the member and hence prevents movement of the head 14 into or through it. In other words, the welded connection insures retaining of the end of the tubular member on the pin 12 adjacent the head 14 and in contact with the pin, even though the intermediate body portion of the tubular member is bulbed into the head.

Although more than one form of the invention has been illustrated and described in detail, it will be apparent to those skilled in the art that various modifications may be made without departing from the scope of the appended claims.

I claim:

1. A rivet comprising a tubular member, the longitudinal and transverse dimensions of said member being so proportioned that it is adapted to be expanded intermediate its ends into a head, and a pin extending through the tubular member and projecting beyond one end thereof, said pin and tubular member adjacent the other end of the latter being connected by welding.

2. A rivet comprising a tubular member, the longitudinal and transverse dimensions of said member being so proportioned that it is adapted to be expanded intermediate its ends into a head, a pin extending through the tubular member, and a head on the pin for engaging one end of the tubular member, said pin and tubular member being welded adjacent the head.

3. A rivet comprising a tubular member, the longitudinal and transverse dimensions of said member being so proportioned that it is adapted to be expanded intermediate its ends into a head, and a pin extending into one end of the tubular member and being welded thereto adjacent such end of the latter.

4. A rivet comprising a tubular member, the longitudinal and transverse dimensions of said member being so proportioned that it is adapted to be expanded intermediate its ends into a head, a pin extending into one end of the tubular member, and a head on the pin engaging the end face of the tubular member, said head being welded to such end face.

5. A rivet comprising a tubular member having a head at one end, the longitudinal and transverse dimensions of said member being so proportioned that it is adapted to be expanded intermediate its ends into a head, and a pin passing through the tubular member said pin and tubular member being welded adjacent the other end of the latter.

6. A rivet comprising a tubular member adapted to project through a structure to be riveted and having a body portion for projection at one side of the structure, and a pin extending through the tubular member and projecting beyond one end thereof to provide a gripping portion, the other end of the pin having a head, said pin and tubular member adjacent the head of the former being welded, for reinforcing the end of the tubular portion against bursting when the pin is pulled through the tubular member for outwardly bulbing said body portion.

7. A rivet comprising a tubular member adapted to project through a structure to be riveted and having a body portion at one end for projection at one side of the structure and which is adapted to be expanded intermediate its ends into a head, and a pin extending through the tubular member and projecting beyond the other end of the latter to provide a gripping portion, said pin and tubular member adjacent the projected end of said projecting body portion being weldingly connected so that upon pulling the pin said projected end of the body portion moves therewith.

8. A rivet comprising a member adapted to project through an opening in a structure to be riveted, and having a tubular body portion adapted to project beyond one side of the structure, and which is adapted to be outwardly expanded intermediate its ends into a head by axially directed compressive forces applied to opposite ends of the member, and means welded to the projected end of said tubular body portion for holding it against outward expansion during application of said axially directed compressive forces and expansion of said intermediate portion of the body.

9. A rivet comprising a member adapted to project through an opening in a structure to be riveted, and having a tubular body portion adapted to project beyond one side of the structure and which is adapted to be outwardly expanded intermediate its ends into a head by axially directed compressive forces applied to opposite ends of the member, and means welded to the projected end of said tubular body portion for holding it against outward expansion during application of said axially directed compressive forces and expansion of said intermediate portion of the body, said means comprising a member projecting into the outer end of said tubular body portion.

10. A rivet comprising a tubular member adapted to project through a structure to be riveted and having a body portion at one end for projection at one side of the structure and which is adapted to be expanded intermediate its ends into a head, and a pin extending into the tubular member, said pin and tubular member adjacent one end of the latter being integrally connected.

11. A rivet comprising a tubular member adapted to project through a structure to be riveted and having a body portion at one end for projection at one side of the structure and which is adapted to be expanded intermediate its ends into a head, and a supporting portion closing one end of the tubular member and projecting thereinto and being integrally connected therewith.

12. The method of riveting which comprises providing a tubular member having an element closing one end and which is integrally connected to the wall of the member at such end, and setting the rivet by applying axially compressive forces against its ends to cause the wall to expand adjacent such closing and connecting element.

WILL E. MORRIS.